United States Patent
Florin et al.

(10) Patent No.: US 8,073,252 B2
(45) Date of Patent: Dec. 6, 2011

(54) SPARSE VOLUME SEGMENTATION FOR 3D SCANS

(75) Inventors: Charles Florin, Trenton, NJ (US); Nikolaos Paragios, Vincennes (FR); James Williams, Nürnberg (DE); Gareth Funka-Lea, Cranbury, NJ (US)

(73) Assignee: Siemens Corporation, Iselin, NJ (US)

( * ) Notice: Subject to any disclaimer, the term of this patent is extended or adjusted under 35 U.S.C. 154(b) by 808 days.

(21) Appl. No.: 11/754,476

(22) Filed: May 29, 2007

(65) Prior Publication Data

US 2011/0123095 A1    May 26, 2011

Related U.S. Application Data

(60) Provisional application No. 60/812,373, filed on Jun. 9, 2006.

(51) Int. Cl.
*G06K 9/34* (2006.01)
(52) U.S. Cl. .......... 382/173; 382/128; 382/160
(58) Field of Classification Search .......... None
See application file for complete search history.

(56) References Cited

U.S. PATENT DOCUMENTS

| | | | |
|---|---|---|---|
| 7,450,746 B2 * | 11/2008 | Yang et al. | 382/131 |
| 7,620,226 B2 * | 11/2009 | Unal et al. | 382/128 |
| 7,646,902 B2 * | 1/2010 | Chan et al. | 382/128 |
| 7,764,817 B2 * | 7/2010 | Georgescu et al. | 382/128 |
| 7,787,683 B2 * | 8/2010 | Khamene et al. | 382/130 |
| 7,873,185 B2 * | 1/2011 | Cremers | 382/103 |
| 7,916,919 B2 * | 3/2011 | Zheng et al. | 382/131 |
| 2003/0020714 A1 * | 1/2003 | Kaus et al. | 345/423 |
| 2004/0068187 A1 * | 4/2004 | Krause et al. | 600/443 |
| 2005/0232485 A1 * | 10/2005 | Brown et al. | 382/173 |
| 2006/0039600 A1 * | 2/2006 | Solem et al. | 382/154 |
| 2006/0147114 A1 * | 7/2006 | Kaus et al. | 382/173 |
| 2007/0014462 A1 * | 1/2007 | Rousson et al. | 382/128 |
| 2007/0091085 A1 * | 4/2007 | Wang et al. | 345/420 |
| 2007/0098221 A1 * | 5/2007 | Florin et al. | 382/103 |
| 2007/0275647 A1 * | 11/2007 | Eger | 345/420 |
| 2008/0002870 A1 * | 1/2008 | Farag et al. | 382/128 |
| 2008/0025592 A1 * | 1/2008 | Jerebko et al. | 382/132 |
| 2008/0123914 A1 * | 5/2008 | De Bliek et al. | 382/128 |
| 2008/0161687 A1 * | 7/2008 | Suri et al. | 600/437 |
| 2008/0180448 A1 * | 7/2008 | Anguelov et al. | 345/475 |
| 2008/0292194 A1 * | 11/2008 | Schmidt et al. | 382/217 |
| 2008/0294401 A1 * | 11/2008 | Tsin et al. | 703/8 |
| 2009/0030657 A1 * | 1/2009 | Berg et al. | 703/1 |
| 2009/0052756 A1 * | 2/2009 | Saddi et al. | 382/131 |
| 2009/0136103 A1 * | 5/2009 | Sonka et al. | 382/128 |
| 2009/0154785 A1 * | 6/2009 | Lynch et al. | 382/131 |
| 2009/0161926 A1 * | 6/2009 | Florin et al. | 382/128 |
| 2009/0190815 A1 * | 7/2009 | Dam et al. | 382/131 |
| 2010/0074499 A1 * | 3/2010 | Wels et al. | 382/131 |
| 2010/0134487 A1 * | 6/2010 | Lai et al. | 345/419 |
| 2010/0176952 A1 * | 7/2010 | Bajcsy et al. | 340/573.1 |
| 2010/0329529 A1 * | 12/2010 | Feldman et al. | 382/131 |
| 2011/0038516 A1 * | 2/2011 | Koehler et al. | 382/128 |
| 2011/0052028 A1 * | 3/2011 | Shreiber | 382/131 |

\* cited by examiner

*Primary Examiner* — Vu Le
*Assistant Examiner* — Xuemei Chen
(74) *Attorney, Agent, or Firm* — Donald B. Paschburg; F. Chau & Associates, LLC (57) ABSTRACT

A computer readable medium is provided embodying instructions executable by a processor to perform a method for sparse volume segmentation for 3D scan of a target. The method including learning prior knowledge, providing volume data comprising the target, selecting a plurality of key contours of the image of the target, building a 3D spare model of the image of the target given the plurality of key contours, segmenting the image of the target given the 3D sparse model, and outputting a segmentation of the image of the target.

11 Claims, 4 Drawing Sheets

N-1, and tested on the remaining volume $V_N$, so that

SPARSE VOLUME SEGMENTATION FOR 3D SCANS

CROSS-REFERENCE TO RELATED APPLICATION

This application claims priority to U.S. Provisional Application Ser. No. 60/812,373, filed on Jul. 9, 2006, which is herein incorporated by reference in its entirety.

BACKGROUND OF THE INVENTION

1. Technical Field

The present invention relates to image segmentation, and more particularly to a system and method for sparse volume segmentation for 3D scans.

2. Discussion of Related Art

As the scanners resolution gets better and better, the slice thickness gets thinner and thinner, and the number of slices for a given organ increases. Therefore, it takes longer and longer to process the data. If this trend goes on, computers capacity (memory+CPU) will not be sufficient to process the whole data, no matter how powerful the segmentation method is.

Therefore; a need exists for sparse volume segmentation for 3D scans.

SUMMARY OF THE INVENTION

According to an embodiment of the present disclosure, a computer readable medium is provided embodying instructions executable by a processor to perform a method for sparse volume segmentation for 3D scan of a target. The method including learning prior knowledge, providing volume data comprising the target, selecting a plurality of key contours of the volume data, building a 3D spare model of the volume data given the plurality of key contours, segmenting the volume data using the 3D sparse model, and outputting a representation of the volume data based on the segmentation using the 3D sparse model.

According to an embodiment of the present disclosure, a computer readable medium is provided embodying instructions executable by a processor to perform a method for sparse volume segmentation for 3D scan of a target. The method includes providing a 3D sparse model of a volume data including the target comprising key indices, key contours at the key indices, an interpolation operator, and an interpolated volume, setting a globally register of the volume data to the 3D sparse model in a model space, segmenting the plurality of key contours at the key indices, inferring a segmentation of a portion of the volume data from the plurality of key contours, and outputting a representation of the volume including the plurality of key contours and the portion of the volume data inferred from the plurality of key contours.

According to an embodiment of the present disclosure, a computer system includes a processor, and a computer readable medium embodying instructions executable by the processor to perform a method for sparse volume segmentation for 3D scan of a target, the method comprising, learning prior knowledge, providing volume data comprising the target, selecting a plurality of 2D key contours of the volume data, building a 3D spare model of the volume data comprising the plurality of 2D key contours, segmenting volume data using the 3D sparse model, wherein a segmentation of a portion of the volume data is inferred from the 3D sparse model, and outputting to a memory device a representation of the volume based on the segmentation using the 3D sparse model.

BRIEF DESCRIPTION OF THE DRAWINGS

Preferred embodiments of the present invention will be described below in more detail, with reference to the accompanying drawings.

DETAILED DESCRIPTION OF EXEMPLARY EMBODIMENTS

Volume segmentation is a relatively slow process and, in certain circumstances, the enormous amount of prior knowledge available is underused. The technique presented in this disclosure allows the use of prior knowledge to build a 3D statistical model that is used to infer the whole volume from a set of critical key contours. These features are then segmented from a dataset, and the rest of the volume is interpolated using a linear regression on the statistical model. The resulting process is more efficient than standard segmentation since most of the workload is concentrated on the critical points, but also more robust, since the interpolated volume is consistent with the prior knowledge statistics. It is applicable to any 3D organ or volume, from any modality.

The present method aims at exploiting prior learning to focus the segmentation workload on critical contours, inferring the rest of the volume and then adjusting locally the segmentation. The overall, method is not only faster than global segmentation (for identical segmentation method), but more robust to local minima, as it uses prior knowledge to constrain the volume shape.

Figure 1:
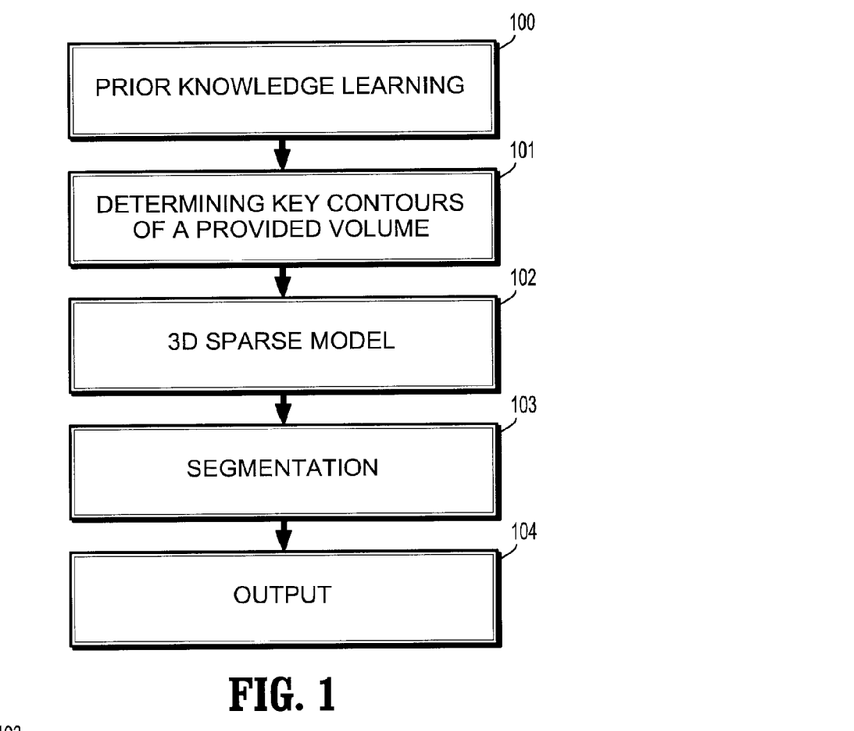
FIG. 1 is a flow chart of a method for 3D sparse segmentation according to an embodiment of the present disclosure.

Referring to FIG. 1, a method for 3D sparse segmentation include learning prior knowledge 100. Although inter-patient variability may be high for certain organs (such as livers), the 3D volumes are all constrained by anatomical properties. This variability is learned using a dimension reduction statistical technique (such as Principal Component Analysis, or Independent Component Analysis) to parameterize the contours (high dimension) in a reduced dimension space.

Figure 3:
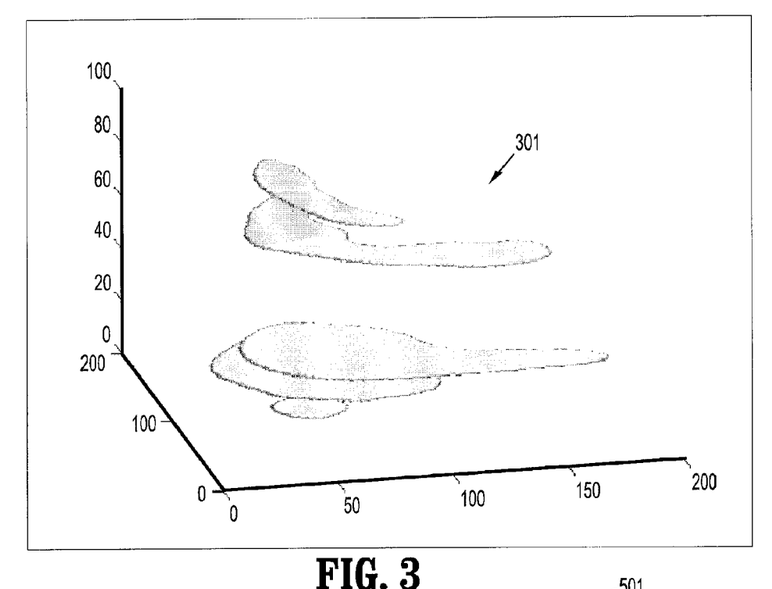
FIG. 3 is a chart of a sparse volume represented by a set of key contours according to an embodiment of the present disclosure.

The method includes finding the contours of an input image 101 that are most relevant to infer the whole volume, for example, see FIG. 3 showing six key contours 301. For this purpose, a selection method determines the key contour indices so that the squared distance between the interpolated volume and the real organ is minimized.

Given N−1 training volumes and 1 testing volume, and given a set of key contour indices $C_1$, the interpolation operator H is computed from the training set $\{V_k\}_{k=1 \ldots N-1}$, and tested on the remaining volume $V_N$, so that $$H = \arg\min_H \{\Sigma_{k=1 \ldots N-1} \|V_k - H(C_I^k)\|^2\} \quad (1)$$

and $$\text{Test measure} = \|H(C_I^k) - V_n\|^2. \quad (2)$$

The test provides the quality measurement for the given set of indices. Using a discreet optimization algorithm (such as Genetic Algorithm), the set of indices I that minimizes the test measure in equation (2) is determined. One of ordinary skill in the art would recognize, in view of the present disclosure, that other methods may be used for determining key contour indices, for example, see equations (7) and (8).

Once the key indices have been determined, the 3D Sparse Model 102 is built to include the key indices I, the key contours at the key indices, $C_I$, the interpolation operator H, and the interpolated volume $V_{interp}=H(C_I)$.

Figure 2:
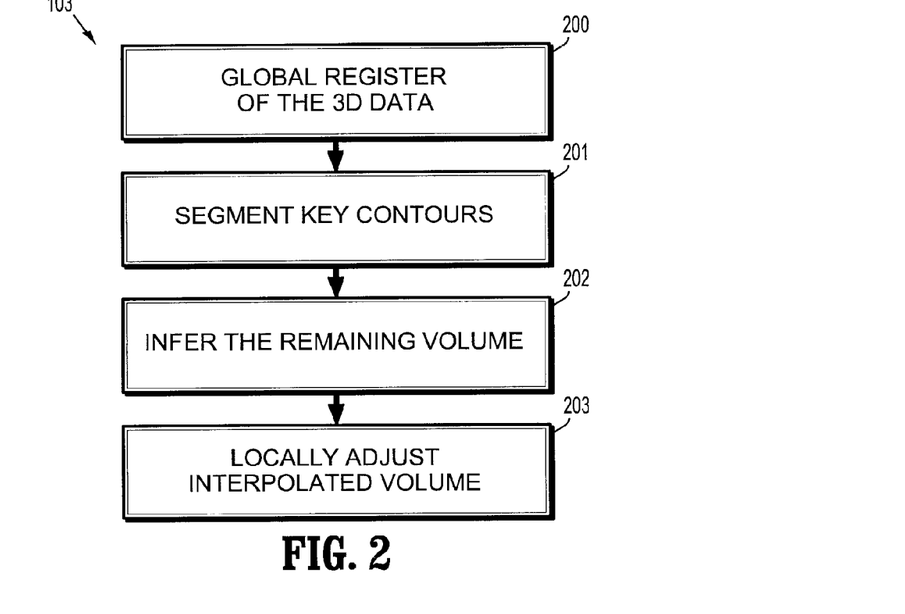
FIG. 2 is a flow chart of a method for segmentation using a 3D sparse model according to an embodiment of the present disclosure.

Given the 3D sparse model, an organ may be segmented 103 and a segmentation of the volume may be output 104 to a display, memory device, etc. Referring to FIG. 2 a segmentation includes setting a globally register of the 3D data to the model in the model space 200, the key contours are segmented at the given indices I 201, the rest of the volume $V_{interp}=H(C_I)$ is inferred 202, and the interpolated volume $V_{interp}$ to the data set is locally adjusted 203.

Referring now to an exemplary implementation of segmenting a liver, according to an embodiment of the present disclosure, a statistical analysis of the data is combined with a reconstruction model from sparse information: only the most reliable information in the image is used, and the rest of the liver's shape is inferred from the model and the sparse observation. The resulting process is more efficient than standard segmentation since most of the workload is concentrated on the critical points, but also more robust, since the interpolated volume is consistent with the prior knowledge statistics. The experimental results on liver datasets prove the sparse information model has the same potential as PCA, if not better, to represent the shape of the liver. Furthermore, the performance assessment from measurement statistics on the liver's volume, distance between reconstructed surfaces and ground truth, and inter-observer variability demonstrates the liver is efficiently segmented using sparse information.

For the choice of sparse information 101, consider a shape x and its partition into m elements $x=(x_1, \ldots, x_m)$ (see FIG. 4) associated to w measures $w=(w_1, \ldots, w_m)$ which reflect the data support for the observations. Without loss of generality, assume the m sub-elements are obtained by a discretization process along one or several axis $v_0$ using an operator $\rho:[\Omega_r \times \mathbb{R}] \to \Omega_r/V_0$:

$$\forall k \in [1, m], x_k = \rho(x, k) \quad (3)$$

In the remaining of the disclosure, this continuous parameterization is assumed when not specified. The approach recovers a small, e.g., minimal, description length set of $|B|$ sub-elements $B=\{x_{t_k}\}_{k\in[1,K]}$ with K small compared to m, and a continuous operator $\phi$, from which the whole data x is deducted:

$$\forall k \in [1,m], \phi(x_{t_1}, \ldots, x_{t_K}, k) = X(k) \quad (4)$$

Considering now a training set of P exemplars $X=[x^1, x^2, \ldots, x^P]$ registered in a reference space $\Omega_r$ 100; toward optimal reconstruction of the training set from the basis B, the distance between the reconstruction and the existing samples is minimized. To this end, let a metric $\psi:[\Omega_r \times \Omega_r] \to \mathbb{R}^+$ measures the distance between two sub-elements. Then, assuming the number of components of the training set is fixed, such reconstruction minimizes $$E_{int}(B, \phi) = \sum_{p=1}^{P} \sum_{i=1}^{m} \psi(x_i^p, \phi_i(x_{t_1}^p, \ldots, x_{t_K}^p)). \quad (5)$$

Such an approach is purely geometric and does not account for the image support of each sub-element.

Turing now to image support; Recall that the sub-elements of a given exemplar $x^p$ have some underlying image support noted $w=(w_1^p, \ldots, w_m^p)$. The optimum basis B include elements that are confidently extracted from the data; therefore, the basis minimizes $$E_{sup}(B) = \sum_{p=1}^{P} \sum_{k=1}^{K} g(w_k^p(T_\theta^{-1}(x_{t_k}^p))) \quad (6)$$

where g is a monotonically decreasing function, and $T_\theta^{-1}(x_{t_k}^p)$ is the inverse mapping between the basis B and the observation space. The use of such inverse mapping is also to be considered during the application of the model to new data. Therefore, it is critical to have a selection of B that is relative robust to errors when locating the basis elements in a new exemplar.

The selection of key contours 101 is robust to parameter variability. Considering a slight variation on the selection of the basis, noted $\delta x_t$, for the interpolation precision of the model not to be significantly affected, $$\lim_{|\delta x_t| \to 0} \frac{E_{int}(B, \phi) - E_{int}(B + \delta x_t, \phi)}{\delta x_t} = 0 \quad (7)$$

that is reformulated in terms of a cost by defining a smoothness function $\eta(\ )$, like the error-two norm, $$E_{var}(B,\phi) = \eta(\nabla_B E_{int}(B,\phi)) \quad (8)$$

Such a penalty term introduces robustness in the basis selection step, as well to the reconstruction process. Now, one integrates these three constraints into a single cost function: $E(B,\phi)=E_{int}(B,\phi)+\alpha E_{sup}(B)+\beta E_{var}(B,\phi)$ where $\alpha$ and $\beta$ are problem specific normalizing constants (results have shown little sensibility to small variations of $\alpha$ and $\beta$). The cost function E is minimized with respect to the interpolation function $\phi$ and the basis B. Such a process cannot be described in a general fashion, but a gradient descent is an excellent choice when considering linear interpolation models, while more advanced non-linear optimization methods like neural networks can be considered for non-linear cases. Last, but not least the residual cost that characterizes the sparse information model is used to determine the best number K of key components that optimizes the Minimum Description Length. In order to demonstrate the efficiency of such a model for volumetric organ segmentation, the particular case of liver segmentation in CT images is considered. The same approach is easily adapted to any other organ, in any dimension.

Referring to the sparse knowledge-based segmentation 103; knowledge-based segmentation is a dominant approach to organ extraction from 3D images. The sparse model is built by selecting a minimal set B of 2D contours (represented in an explicit or an implicit fashion) along with an interpolation function $\phi$ to reconstruct the whole 3D surface in the reference space $\Omega_r$. During the segmentation, the global transformation $T_\theta$ that relates the reconstructed model to the observation volume is to be determined, along with the set B of 2D contours that fits the observation.

Referring to the model construction 102; the experiment is conducted on segmentation for medical imaging for the case of liver in Computed Tomography (CT). The training set is represented by exemplars x by 3D distance maps to the closed surface Γ defined by the liver's edge C in the volumetric data:

$$\forall p \in \Omega, \qquad (9)$$
$$x(p) = \begin{cases} 0, & p \in C \\ +D(p) \geq 0, & p \in \Gamma \\ -D(p) < 0, & p \in \bar{\Gamma}. \end{cases}$$

Such a selection is motivated from its implicit nature, as well as the ability to introduce surface-based as well as area based criteria in the segmentation process. Classic explicit parameterizations like triangulated surfaces, or other form of parametric snakes can also be considered.

The acquisition process guides the choice for the definition of the sub-elements: since the image volume is reconstructed slice by slice, with maximum resolution in the slice plane, the axis of projection $v_{i_0}$ is the longitudinal axis. Therefore, a sub-element $x_i$ corresponds to a particular slice. The geometric transformation $T_\theta$ is a translation-scaling that sets x in a reference space $\Omega_r$ with m slices $(x_i, \ldots, x_m)$.

In order to determine the best possible interpolation class, different models for $\phi$ have been tested. Generalized linear interpolation for each slice i has been determined to be a good compromise between complexity and interpolation quality. The solution (2D contour) at each slice $x_i$ is reconstructed using a particular linear combination $H_i$ of the key contours $x_{t_1}, \ldots, x_{t_k}$. This notation is kept in the remaining of the disclosure: $\phi = H$. The interpolation quality is defined according to sum of square difference between the reconstructed distance map and the observed shape's distance map in the reference space $\Omega_r$:

$$E_{int}(B, H) = \sum_{i=1}^{m} \int_{\Omega_r} |H_i[x_{t_1}, \ldots x_{t_K}]^T - x_i|^2 \qquad (10)$$

$E_{int}$ is a quadratic function with global minimum, and since the reference space $\Omega_r$ is a continuous space, the minimization of $E_{int}$ benefits from the large literature on quadratic functions minimization.

The image support $w_i$ at slice i is defined by the Kullback-Leibler distance between the pixels intensity distributions inside and outside the 2D contour and the a priori learned histograms. Knowing a priori the normalized histogram $h_{in}$ (resp. $h_{out}$) of the pixels intensity inside (resp. outside) the liver, and computing the pixels intensity distribution $p_{in}$ and $p_{out}$ inside and outside of the reconstructed shape on the key slices, $$E_{sup}(B) = \qquad (11)$$
$$\sum_{k=1}^{K} \int h_{in}(k,s) \log\left(\frac{h_{in}(k,s)}{p_{in}(k,s)}\right) ds + \sum_{k=1}^{K} \int h_{out}(k,s) \log\left(\frac{h_{out}(k,s)}{p_{out}(k,s)}\right) ds.$$

The key contours are chosen 101 so as to minimize the impact of variations in their position, and of errors in the contours extraction in the key slices. Since a continuous interpolation of the 2D contours is introduced in equation (3), the impact of an infinitesimal change dc in the slice index may be written as the squared magnitude of the gradient of $x_{t_k}$ with respect to $t_k$: $\|\nabla_{t_k} x_{t_k}\|^2$. In practice, since the contours are represented using distance functions (see equation (9)), the derivative of the distance function at index $t_k$, with respect to the index, is a field of 2D vectors whose squared magnitude is $\|\nabla_{t_k} x_{t_k}\|^2$. Therefore, the key contours are chosen 101 so as to minimize the integral over the image space of the distance map's gradient at the key locations:

$$E_{var}(B) = \sum_{k=1}^{K} \int_{\Omega_r} \|\nabla_{t_k} x_{t_k}\|^2. \qquad (12)$$

In order to determine the number K, the indices of the key contours $t_1, \ldots, t_k$ as well as the interpolation operator H, a gradient descent optimization method is used and combined with the Schwarz Bayesian criterion to determine the optimum cardinality of the basis. After registering the volumes with m=100 slices, the optimum number of key slices is determined, in this example 5 key slices are used. The selected key slices form the 3D sparse model 102.

For model-based segmentation 103, with sparse model 102 in hand, the volumetric segmentation includes the segmentation of the shape at key slices, where the whole 3D segmentation problem is reduced to a small set of parallel 2D contours to be segmented at specific locations. Therefore, one needs to optimize an image-based cost function with respect to both the set of key contours $B = x_{t_1}, \ldots, x_{t_k}$ in the reference space and the transformation $T_\theta$ simultaneously. In an iterative optimization scheme, the transformation $T_\theta$ at a given iteration is used to relate the current set of 2D contours $x_{t_1}, \ldots, x_{t_k}$ to the image so that both the transformation and the sparse set of contours are optimized concomitantly.

To this end, the cost function includes the intensity-based likelihood of each pixel, assuming that normalized histograms inside ($h_{in}$) and outside ($h_{out}$) the liver are available (if not, one recovers them on-the-fly). Then, the posterior likelihood of the partition with respect to the two classes is maximized to obtain the key contours B and the transformation $T_\theta$:

$$E_{seg}(B, T_\theta) = \sum_{k=1}^{K} \int_\Omega -\log(h_{in}(I(s))) \mathcal{H}(x_{t_k}(T_\theta(s))) ds + \qquad (13)$$
$$\sum_{k=1}^{K} \int_\Omega -\log(h_{out}(I(s)))(1 - \mathcal{H}(x_{t_k}(T_\theta(s)))) ds,$$

where $H(x_{t_k})(s))$ denotes the Heaviside function that is equal to 1 inside the contour $x_{t_k}$ and 0 outside. During the sparse model's construction the image support has been taken into account in the selection of the key slices. This information has been inherited to the segmentation and, in principle, the slices where one best separates liver from the rest of the background are used (see equation (11)). When (B; $T_\theta$) have reached the energy minimum, the whole volumetric shape x is reconstructed in $\Omega_r$ by applying the linear combination $H_i$ for each slice i. The inverse of $T_\theta$ is used to transform the reconstructed volume from $\Omega_r$ to the image space $\Omega$. In a subsequent step, one may consider refining the results by locally optimizing 203 the solution x on each slice i, using the sparse model's result as a prior.

Experimental validation of methods described herein have been performed. Turing first to the dimensionality reduction using a sparse information model, before proving sparse information models are efficiently used to segment an organ in volumetric data, one needs to quantify the error introduced by the sparse models dimension reduction and compare it with common techniques such as PCA. The volumetric data is acquired on Sensation 16 CT scanners, with an average resolution of 1 mm in axial plane and 3 mm along the longitudinal axis. 31 volumes (different oncology patients, with or without pathologies such as tumors) are used in our experiments on a leave-one-out basis: 30 volumes are used to build the models (sparse and PCA) and the last one is used for testing.

Table (1) summarizes the error introduced by dimensionality reduction for PCA (30 modes), linear interpolation and Sparse Information Model with 5 slices. This error measure is defined as the symmetric difference between the two volumes $V_1$ and $V_2$:

$$\epsilon = 1 - \frac{|V_1 \cap V_2|}{0.5 * (|V_1| + |V_2|)} \quad (14)$$

TABLE 1

Results table showing the median, maximum and minimum symmetric difference between ground truth volumes and reconstructed volumes using PCA (30 modes), linear interpolation from 5 key slices and Sparse Information Model (SIM) with 5 key slices.

| method | PCA | Linear interp. | SIM |
|---|---|---|---|
| median symmetric diff. | 11.70% | 10.72% | 8.35% |
| maximum symmetric diff. | 23.32% | 16.13% | 13.14% |
| minimum symmetric diff. | 6.56% | 7.69% | 6.28% |

The results demonstrate that the sparse information model with 5 key elements provides the same reconstruction quality than linear PCA with 30 modes of variation. However, the PCA results have a large variance because diseased organs are poorly represented by a Gaussian model in the linear. PCA space. Nevertheless, a larger study with different pathologies could demonstrate kernel PCA best represents the shapes.

Figure 4A:
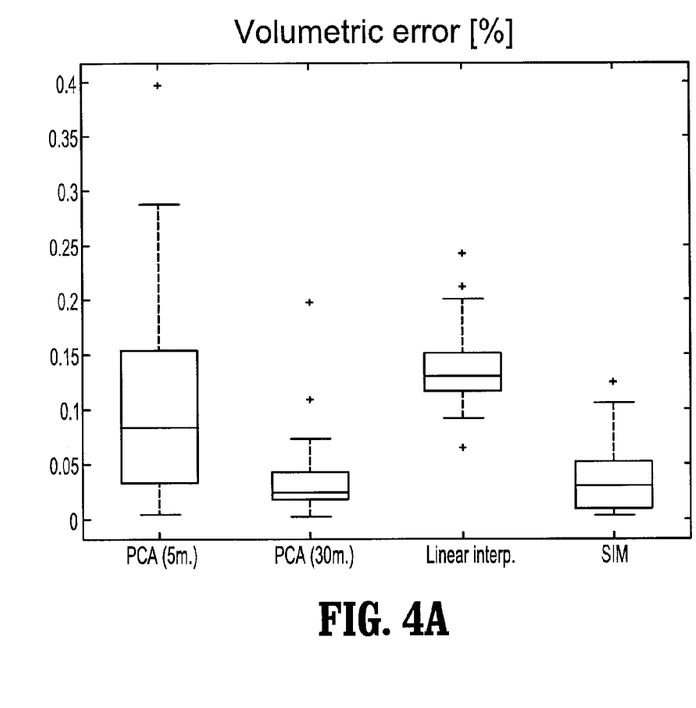
FIGS. 4A-D are segmentation result boxplots comparing PCA (5 and 30 modes), linear interpolation and sparse information model according to an embodiment of the present disclosure.
Figure 4B:
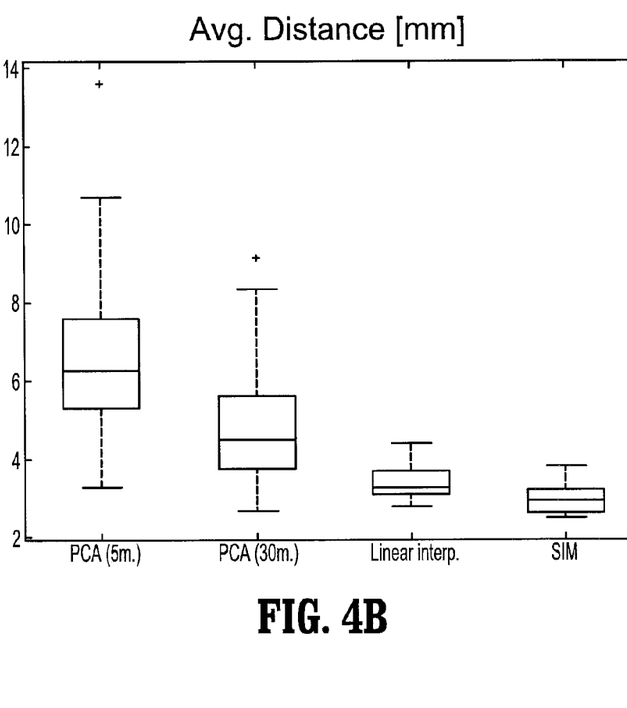
Figure 4C:
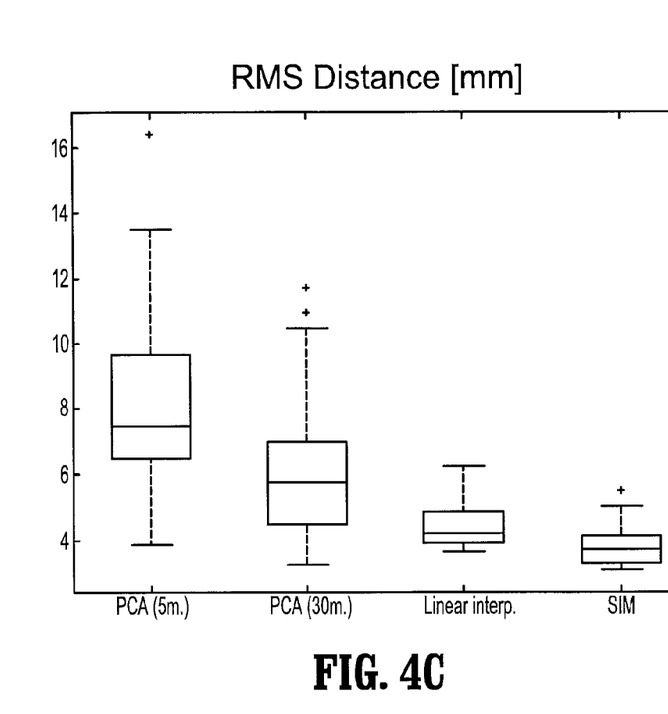
Figure 4D:
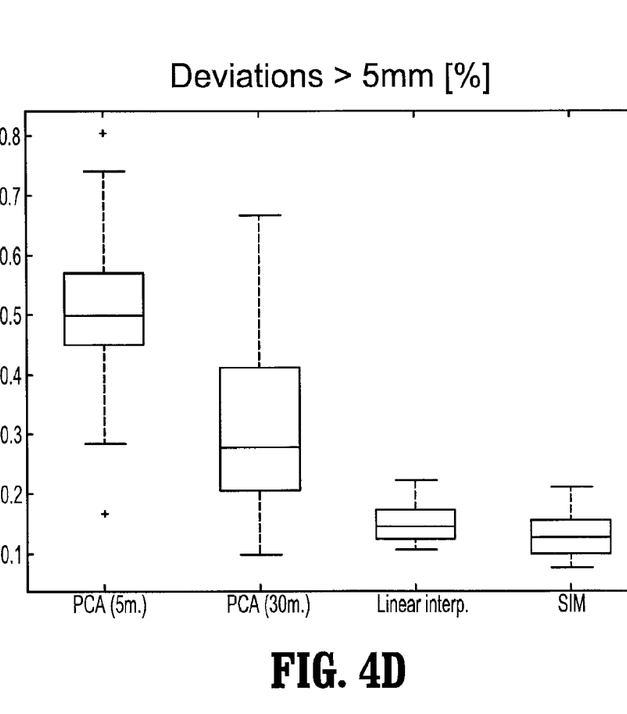

FIGS. 4A-D illustrate different error measures for liver segmentation with linear PCA (5 and 30 modes), liner interpolation and sparse information model. The quality assessment is performed with four error measures: the volumetric error in % (FIG. 4A), the average surface distance (FIG. 4B), the RMS distance (FIG. 4C), and the percentage of surface father than 5 mm from the ground truth (FIG. 4D). Each box has lines at the lower quartile, median, and upper quartile values. The whiskers are lines extending from each end of the box to show the extent of the rest of the data. Outliers are data with values beyond the ends of the whiskers.

A second portion of the experimentation demonstrates that sparse information models can efficiently be used for segmentation. For that purpose, it is assumed an expert (i.e. either a human expert, or an expert system such as the ones described in the literature) roughly initializes the rigid transformation and the key contours. When no user interaction is available, a preprocessing step, such as exhaustive search or coarse-to-fine search, is to be developed. In the case of PCA, the segmentation problem is solved by minimizing the cost function resulting from the intensity-based likelihood of each pixel in the volumetric image:

$$E_{seg} = \sum_{k=1}^{m} \int_{\Omega} -\log(h_{in}(I(s)))\mathcal{H}(x_k(T_\theta(s))) d\Omega + \sum_{k=1}^{m} \int_{\Omega} -\log(h_{out}(I(s)))(1 - \mathcal{H}(x_k(T_\theta(s)))) d\Omega, \quad (15)$$

Equation (15) is minimized in the PCA's parametric space, where the shapes' distribution is modeled using kernels. The kernels are justified by the poor modeling of the samples distribution by a Gaussian. For the PCA segmentation, all the m slices of the volume are used, whereas the Sparse Information Model only segments the K slices determined during the model construction (see equation (13)).

Table (2) summarizes the symmetric difference (see equation (14)) between ground truth and the segmented liver obtained using the sparse information model and PCA. Neighboring structures of similar intensities juxtapose the liver in a way that PCA estimates as a shape variation. On the contrary, the Sparse Model ignores the regions with low support, and reconstructs the information in these regions based on other visual clues elsewhere in the image. For information, the inter-observer symmetric difference in table (2) indicates the symmetric difference between livers segmented by different experts using the same semi-automatic tool. The results seem to demonstrate sparse information models outperform active shape models. Nevertheless, it must be underlined that the training and evaluation datasets are different. Furthermore, the shape model is built from smoothed surface meshes, while the training shapes used here are represented by distance functions (see equation (9)) and are not smoothed. However, as one suspects, Sparse Information Models are sensitive to initialization. To quantify this, two different Sparse Segmentations were performed by segmenting by hand the key slices in the datasets, and comparing the reconstruction results with the ground truth. The difference in quality (symmetric difference with ground truth) between the different reconstructions ranges from 0.02% to 6.73%. Moreover, this variance is not correlated to the IOV (correlation coefficient of 0.47); otherwise stated, a volume with high inter-observer variability may be segmented by the SIM in a way that is robust to initialization, and reciprocal may be true. Indeed, the IOV depends on the whole organ's structure while the SIM's quality only depends on the key slices. Furthermore, the maximum quality difference of 6.73% is below the maximum IOV symmetric difference (7.83% in table (2)).

TABLE 2

Results table showing the average symmetric difference and maximum symmetric between hand-segmented livers and automatic segmentation with PCA and Sparse Information Model (SIM). Also, is also given the Inter-Observer Variability (IOV) statistics.

| method | PCA | SIM | IOV |
|---|---|---|---|
| median symmetric diff. | 26.41% | 11.49% | 5.56% |
| maximum symmetric diff. | 36.84% | 17.13% | 7.83% |
| minimum symmetric diff. | 16.68% | 9.49% | 2.96% |

Herein, a family of dimension reduction techniques have been described based on intelligent selection of key sub-elements with respect to reconstruction quality, image support and variability of these key sub-elements. It is demonstrated that sparse information models can be used for dimensionality purposes, and can efficiently be integrated into a segmentation framework in the context of volumetric organ segmentation. This technique has been applied to the problem of liver segmentation in volumetric images with successful results compared to common dimensionality reduction techniques based on linear projections and kernel distributions. On top of interpolation and segmentation quality, this method is also very fast since only the most important and most reliable information is processed for the reconstruction of the whole information. However, a statistical shape model may not be sufficient to represent the exact shape of the liver; in a post-processing step, a local optimization—using active contours for instance—may be needed for better results. This local optimization would not be computed from sparse information. Further work will investigate the use of non-linear models for the interpolation function, as well as a subsequent refinement that will locally adjust the reconstruction from the model to the actual image information by taking into account the confidence in the reconstruction. More advanced prior models using axial coronal and sagittal sparse information would be an extension of these methods, as it would diminish the quality difference between two differently initialized segmentations. Further, methods described herein may be used for feature extraction, classification and content-based image indexing and retrieval.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
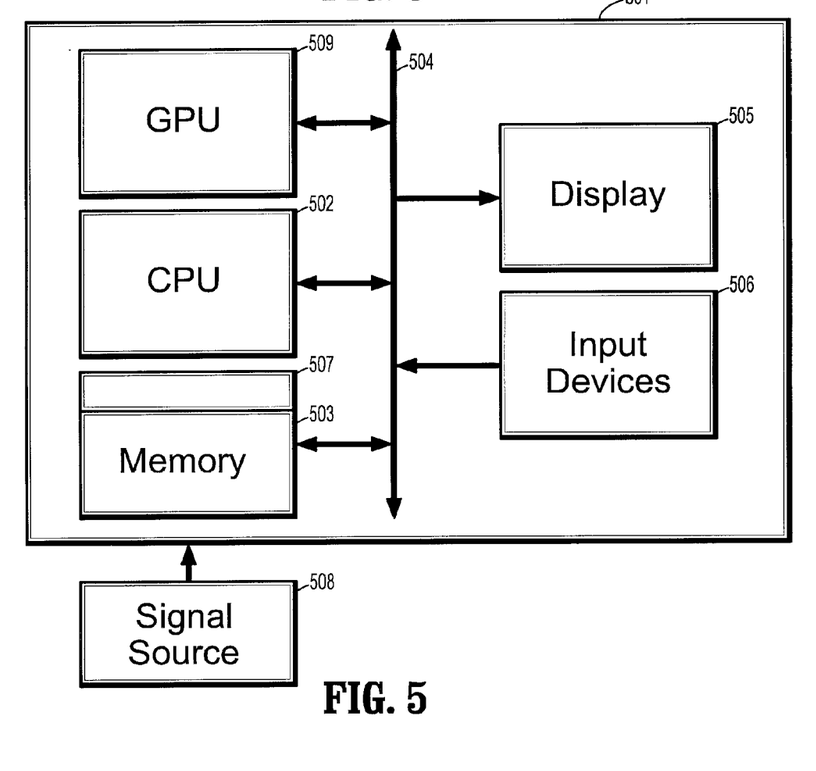
FIG. 5 is a diagram of a system according to an embodiment of the present disclosure.

Referring to FIG. 5, according to an embodiment of the present invention, a computer system 501 for sparse volume segmentation for 3D scans can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process a signal, e.g., a closed surface mesh, from the signal source 508. As such, the computer system 501 is a general purpose computer system that becomes a specific purpose computer system when executing the routine 507 of the present invention.

The computer platform 501 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for sparse volume segmentation for 3D scans, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executable by a processor to perform a method for sparse volume segmentation for 3D scan of a target, the method comprising:
   receiving an observation volume;
   providing volume data comprising the target;
   selecting a plurality of key contours of the volume data;
   building a 3D sparse model of the volume data given the plurality of key contours;
   determining a volumetric segmentation of a volume data by optimizing an image-based cost function with respect to simultaneously both the set of key contours in a reference space and a transformation which relates a reconstructed model to the observation volume; and
   outputting a representation of the volume data based on the segmentation using the 3D sparse model.

2. The method of claim 1, further comprising parameterizing the key contours in a reduced dimension space.

3. The method of claim 1, wherein selecting the key contours includes determining key contour indices so that a squared distance between an interpolated volume and the target is minimized.

4. The method of claim 1, wherein the 3D sparse model includes key indices, the key contours at the key indices, an interpolation operator, and an interpolated volume.

5. The method of claim 4, wherein determining the volumetric segmentation comprises:
   setting a global register of the volume data to the 3D sparse model in a model space;
   segmenting the plurality of key contours at the key indices; and
   inferring the volumetric segmentation of a portion of the volume data from the plurality of key contours.

6. The method of claim 5, further comprising adjusting, locally, an interpolated volume to the volume data.

7. The method of claim 1, wherein the plurality of key contours are 2D contours.

8. A non-transitory computer readable medium embodying instructions executable by a processor to perform a method for sparse volume segmentation for 3D scan of a target, the method comprising:
   providing a 3D sparse model of a volume data including the target comprising key indices, key contours at the key indices, an interpolation operator, and an interpolated volume;
   setting a global register of the volume data to the 3D sparse model in a model space;
   segmenting the plurality of key contours at the key indices;
   inferring a segmentation of a portion of the volume data from the plurality of key contours; and
   outputting a representation of the volume including the plurality of key contours and the portion of the volume data inferred from the plurality of key contours.

9. The method of claim 8, further comprising adjusting, locally, an interpolated volume to the volume data.

10. A computer system comprising:

a processor; and a computer readable medium embodying instructions executable by the processor to perform a method for sparse volume segmentation for 3D scan of a target, the method comprising:

receiving an observation volume;

providing volume data comprising the target;

selecting a plurality of key contours of the volume data;

building a 3D sparse model of the volume data given the plurality of key contours;

determining a volumetric segmentation of a volume data by optimizing an image-based cost function with respect to simultaneously both the set of key contours in a reference space and a transformation which relates a reconstructed model to the observation volume; and outputting a representation of the volume data based on the segmentation using the 3D sparse model.

11. The system of claim 10, wherein the 3D sparse model includes key indices, the plurality of 2D key contours at the key indices, an interpolation operator, and an interpolated volume.

* * * * *